(12) United States Patent
Katou et al.

(10) Patent No.: US 9,358,465 B2
(45) Date of Patent: Jun. 7, 2016

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventors: Jun Katou, Tokyo (JP); Hiroyuki Kikkawa, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 79 days.

(21) Appl. No.: 14/220,394

(22) Filed: Mar. 20, 2014

(65) Prior Publication Data

US 2014/0287830 A1    Sep. 25, 2014

(30) Foreign Application Priority Data

Mar. 25, 2013    (JP) .................................. 2013-062175

(51) Int. Cl.
| | |
|---|---|
| A63F 13/10 | (2006.01) |
| A63F 13/30 | (2014.01) |
| A63F 13/69 | (2014.01) |
| A63F 13/46 | (2014.01) |
| A63F 13/79 | (2014.01) |

(52) U.S. Cl.
CPC ................ *A63F 13/30* (2014.09); *A63F 13/46* (2014.09); *A63F 13/69* (2014.09); *A63F 13/79* (2014.09)

(58) Field of Classification Search
USPC ...................................................... 463/30, 31
See application file for complete search history.

(56) References Cited

U.S. PATENT DOCUMENTS

| | | | | |
|---|---|---|---|---|
| 2013/0281171 A1* | 10/2013 | Ramsour | ............. | G07F 17/3295 463/10 |
| 2014/0302923 A1* | 10/2014 | Sato | ...................... | A63F 13/847 463/31 |

FOREIGN PATENT DOCUMENTS

JP    2005-110948    4/2005

OTHER PUBLICATIONS

"FAMITSU App iPhone & Android No. 005", Kadokawa Corporation Enterbrain, pp. 116 and 117 (Jan. 2, 2013).
"Monthly App Style", East Press, vol. 1, No. 3, p. 58 (Feb. 28, 2013).
Office Action from Japan Patent Office (JPO) in Japanese Patent Application No. 2013-062175, dated Apr. 2, 2014, together with an English language translation thereof.

* cited by examiner

*Primary Examiner* — Pierre E Elisca
(74) *Attorney, Agent, or Firm* — Greenblum & Bernstein, P.L.C.

(57) ABSTRACT

A display device is caused to selectably display panels in a predetermined area of a display screen in a predetermined arrangement pattern. When selection of at least one displayed panel is received from a user of a video game processing apparatus, the selected panel and the number of panels are specified. It is determined whether the number of panels satisfies a skill activating condition of a player character or not by referring to skill related information. The skill related information is stored in a skill related information memory. The skill related information contains player character information indicating the player character, skill information indicating a skill, and the skill activating condition indicating an activating condition of the skill. In a case where it is determined that the number of panels satisfies the skill activating condition, action processing for the skill by the player character is carried out.

4 Claims, 14 Drawing Sheets

100: VIDEO GAME PROCESSING SYSTEM

CHARACTER INFORMATION

| CHARACTER TYPE | CHARACTER ID | CHARACTER NAME | APPEARANCE MODE | JOB | STATUS | ... |
|---|---|---|---|---|---|---|
| PLAYER CHARACTER | 1 | A | TYPE 1 | FIGHTER | ... | ... |
| PLAYER CHARACTER | 2 | B | TYPE 2 | SOLDIER | ... | ... |
| PLAYER CHARACTER | 3 | C | TYPE 3 | MAGICIAN | ... | ... |
| PLAYER CHARACTER | 4 | D | TYPE 4 | PRIEST | ... | ... |
| ⋮ | ⋮ | ⋮ | ⋮ | ⋮ | ⋮ | ⋮ |
| ENEMY CHARACTER | 78 | X | TYPE N | − | ... | ... |
| ⋮ | ⋮ | ⋮ | ⋮ | ⋮ | ⋮ | ⋮ |

Fig. 4

PANEL INFORMATION

| PATTERN (ATTRIBUTE) | JOB | ACTION |
|---|---|---|
| FIST | FIGHTER | ATTACK SINGLE ENEMY WITH FIST |
| SWORD | SOLDIER | ATTACK SINGLE ENEMY WITH SWORD |
| WAND | MAGICIAN | ATTACK SINGLE ENEMY WITH MAGIC |
| CROSS | PRIEST | ATTACK SINGLE ENEMY WITH MAGIC |

Fig. 5

SKILL RELATED INFORMATION

| CHARACTER ID | SKILL ID | SKILL ACTIVATING CONDITION | SKILL CONTENT | SKILL COUNT VALUE | SKILL ACTIVATING REPRESENTATION |
|---|---|---|---|---|---|
| 1 | SKILL 1 | ATTRIBUTE: FIST / SKILL COUNT VALUE: 5 OR MORE / PANEL SELECTION NUMBER: 5 OR MORE | ... | 4 | ... |
| 2 | SKILL 2 | ATTRIBUTE: SWORD / SKILL COUNT VALUE: 5 OR MORE / PANEL SELECTION NUMBER: 5 OR MORE | ... | 4 | ... |
| 3 | SKILL 3 | ATTRIBUTE: WAND / SKILL COUNT VALUE: 5 OR MORE / PANEL SELECTION NUMBER: 5 OR MORE | ... | 3 | ... |
| 4 | SKILL 4 | ATTRIBUTE: CROSS / SKILL COUNT VALUE: 5 OR MORE / PANEL SELECTION NUMBER: 5 OR MORE | ... | 3 | ... |

Fig. 6

SUMMON MONSTER INFORMATION

| SUMMON MONSTER ID | ATTRIBUTE | ACTION CONTENT | DISPLAY MODE | STATUS | SUMMON OPERATION METHOD | SUMMON MONSTER ACTIVATING REPRESENTATION | ... |
|---|---|---|---|---|---|---|---|
| SUMMON MONSTER 1 | FIST | WHOLE HEAVY DAMAGE | ... | ... | ↓ | ... | ... |
| SUMMON MONSTER 2 | SWORD | SINGLE HEAVY DAMAGE | ... | ... | ← | ... | ... |
| SUMMON MONSTER 3 | WAND | WHOLE HEAVY DAMAGE | ... | ... | → | ... | ... |
| SUMMON MONSTER 4 | CROSS | WHOLE RECOVERY | ... | ... | ↑ | ... | ... |
| ⋮ | ⋮ | ⋮ | ⋮ | ⋮ | ⋮ | ⋮ | ⋮ |

Fig. 15

SKILL RELATED INFORMATION

| CHARACTER ID | SKILL ID | SKILL ACTIVATING CONDITION | SKILL CONTENT | SKILL COUNT VALUE | SKILL ACTIVATING REPRESENTATION |
|---|---|---|---|---|---|
| 1 | SKILL 1 | ATTRIBUTE: FIST / SKILL COUNT VALUE: 5 OR MORE / PANEL SELECTION NUMBER: 5 OR MORE | ... | 4 | ... |
| 2 | SKILL 2 | ATTRIBUTE: SWORD / SKILL COUNT VALUE: 5 OR MORE / PANEL SELECTION NUMBER: 5 OR MORE | ... | 5 | ... |
| 3 | SKILL 3 | ATTRIBUTE: WAND / SKILL COUNT VALUE: 5 OR MORE / PANEL SELECTION NUMBER: 5 OR MORE | ... | 3 | ... |
| 4 | SKILL 4 | ATTRIBUTE: CROSS / SKILL COUNT VALUE: 5 OR MORE / PANEL SELECTION NUMBER: 5 OR MORE | ... | 3 | ... |

Fig. 16

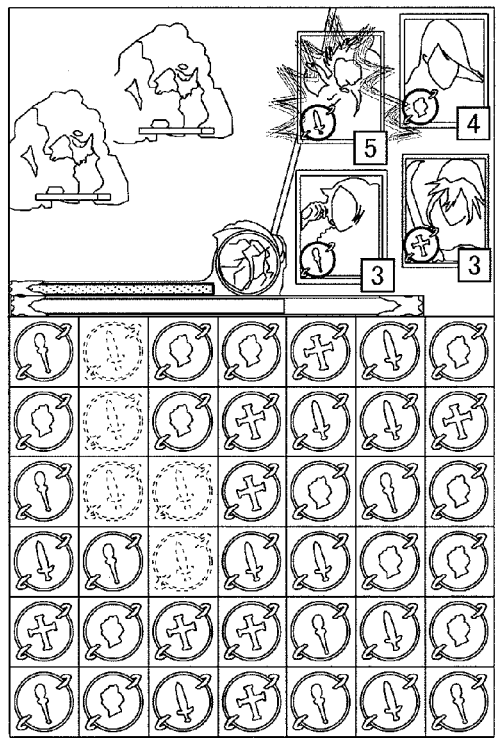

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2013-062175, filed on Mar. 25, 2013, the disclosure of which is expressly incorporated herein by reference in its entirety.

BACKGROUND OF THE INVENTION

1. Field of the Invention

The present invention relates to a technique for controlling progress of a video game while displaying an object on a display screen of a display device.

2. Description of the Related Art

Heretofore, there has been video games each of which controls progress of the video game while displaying an object on a display screen of a display device. In such video games, there is a puzzle game in which a user is caused to carry out a selection operation and the video game is thereby caused to proceed (see Japanese Patent Application Publication No. 2005-110948, for example).

SUMMARY OF THE INVENTION

The present invention has been made in order to solve the problem described above, and it is an object of the present invention to provide a new puzzle game with higher interest by developing the puzzle game in which a user is caused to carry out a selection operation and the video game is thereby caused to proceed.

In order to achieve the above object, in one aspect of the present invention, the present invention is directed to a video game processing apparatus for controlling progress of a video game while displaying an object on a display screen of a display device. The video game processing apparatus according to the present invention includes a skill related information memory for storing skill related information therein, the skill related information containing player character information indicating a player character, skill information indicating a skill, and a skill activating condition indicating an activating condition of the skill.

The video game processing apparatus also includes a panel display controller for causing the display device to selectably display a plurality of panels in a predetermined area of the display screen in a predetermined arrangement pattern.

The video game processing apparatus also includes a selection receiver for receiving selection of at least one panel displayed by the panel display controller from a user of the video game processing apparatus.

The video game processing apparatus also includes a panel specifier for specifying the at least one panel received by the selection receiver.

The video game processing apparatus also includes a panel number specifier for specifying the number of panels specified by the panel specifier.

The video game processing apparatus also includes a skill activating condition determiner for determining whether the number of panels specified by the panel number specifier satisfies the skill activating condition of the player character or not by referring to the skill related information.

The video game processing apparatus also includes a skill action processing executor for carrying out action processing for the skill by the player character in a case where the skill activating condition determiner determines that the number of panels satisfies the skill activating condition.

By configuring the video game processing apparatus as described above, it is possible to provide a new puzzle game.

In the video game processing apparatus according to the present invention, it is preferable that the skill related information contains a count value that is associated with the player character and is related to the skill activating condition. In this case, the video game processing apparatus may further includes: an update possibility determiner for determining whether the number of panels specified by the panel number specifier is the count value or more; and a count value updater for updating the count value in a case where the update possibility determiner determines that the number of panels is the count value or more, wherein the skill activating condition determiner determines whether the number of panels specified by the panel number specifier and the count value satisfy the skill activating condition or not.

In the video game processing apparatus according to the present invention, it is preferable that the video game processing apparatus further includes a panel information memory for storing panel information, the panel information containing attribute information indicating an attribute of a panel, wherein the player character information contains attribute information indicating an attribute of the player character, and wherein the update possibility determiner determines whether the number of panels specified by the panel specifier is the count value or more in a case where the attribute of the panel specified by the panel specifier and the attribute of the player character become a predetermined relationship.

Moreover, in another aspect of the present invention, the present invention is directed to a non-transitory computer-readable medium including a video game processing program product for causing a computer to control progress of a video game while displaying an object on a display screen of a display device. In this case, the video game processing apparatus includes a skill related information memory for storing skill related information therein, the skill related information containing player character information indicating a player character, skill information indicating a skill and a skill activating condition indicating an activating condition of the skill. The video game processing program product according to the present invention causes the video game processing apparatus to execute steps including causing the display device to selectably display a plurality of panels in a predetermined area of the display screen in a predetermined arrangement pattern.

The steps also includes receiving selection of at least one panel displayed in the causing the display device to selectably display a plurality of panels from a user of the video game processing apparatus.

The steps also includes specifying the at least one panel received in the receiving selection of at least one panel.

The steps also includes specifying the number of panels specified in the specifying the at least one panel.

The steps also includes determining whether the number of panels specified in the specifying the number of panels satisfies the skill activating condition of the player character or not by referring to the skill related information.

The steps also includes carrying out action processing by the skill of the player character in a case where it is determined, in the determining whether the number of panels specified in the specifying the number of panels satisfies the skill activating condition, that the number of panels satisfies the skill activating condition.

According to each embodiment of the present invention, it is possible to provide a new puzzle game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanatory drawing showing an example of a storage state of panel information;

FIG. 5 is an explanatory drawing showing an example of a storage state of skill related information;

FIG. 6 is an explanatory drawing showing an example of a storage state of summon monster information;

FIG. 15 is an explanatory drawing showing an example of a storage state of skill related information when the skill related information shown in FIG. 5 is updated;

FIG. 16 is a screen drawing showing an example of the battle screen on which a player character is highlighted;

DETAILED DESCRIPTION OF THE INVENTION

Hereinafter, an example of one embodiment according to the present invention will be described with reference to the appending drawings.

Figure 1:
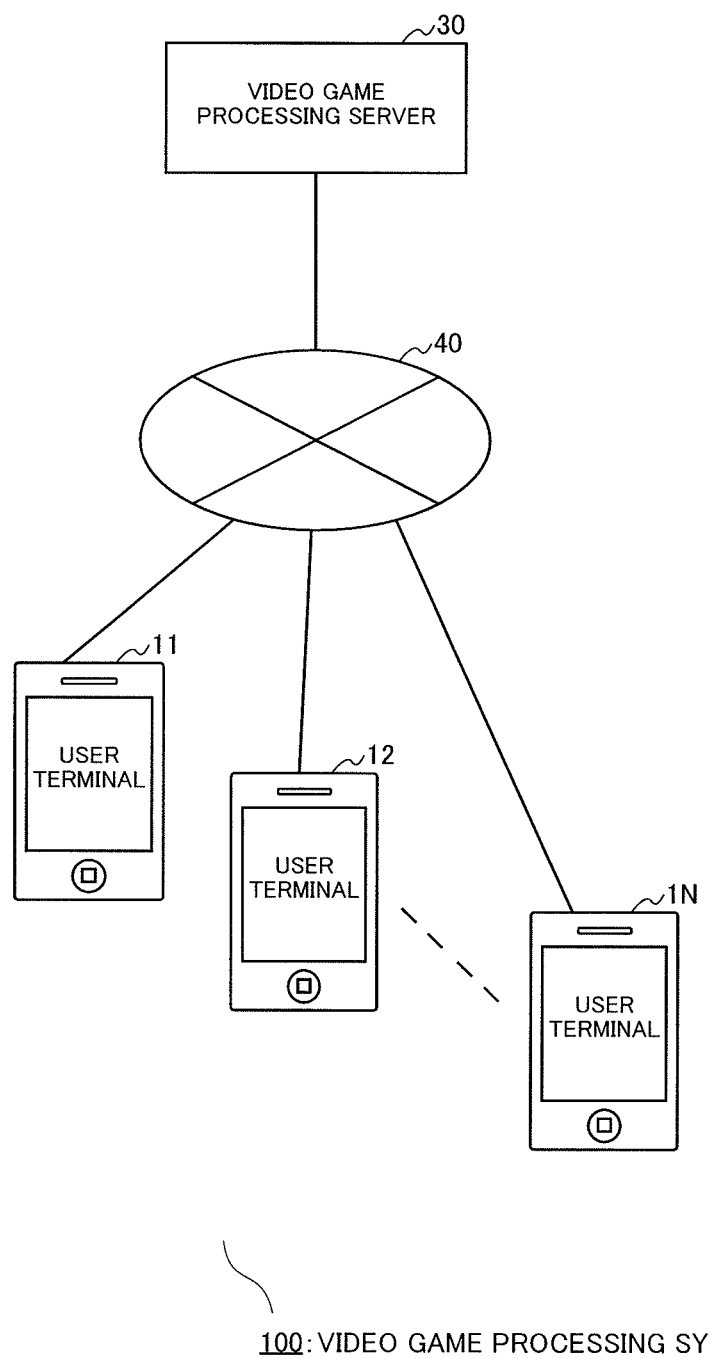
FIG. 1 is a block diagram showing a configuration example of a video game processing system.

FIG. 1 is a block diagram showing an example of a configuration of a video game processing system 100 according to one embodiment of the present invention. As shown in FIG. 1, the video game processing system 100 includes: a user terminals 11 to 1N ("N" is an arbitrary integer) respectively used by a plurality of users (players); and a video game processing server 30. In this regard, the configuration of the video game processing system 100 is not limited to this configuration. The video game processing system 100 may be configured so that a plurality of users uses a single user terminal, and/or so as to include a plurality of servers.

Each of the plurality of the user terminals 11 to 1N is managed by a user (or a player) who plays a video game, for example, and is configured by a mobile communication terminal that is allowed to carry out a network delivery-type video game, such as a cellular phone terminal, a PDA (Personal Digital Assistants), a portable game apparatus or the like. Each of the plurality of the user terminals 11 to 1N includes hardware (for example, a display device for displaying a game screen, an audio output device, and the like) and software for connecting the corresponding user terminal 11 to 1N to a communication network 40 and carrying out the video game by communicating with the video game processing server 30. In this regard, the video game processing system 100 may be configured so that the plurality of the user terminals 11 to 1N can carry out direct communication with each other without the video game processing server 30.

Further, the display device of each of the plurality of the user terminals 11 to 1N has a function as a touch panel by laminating a touch panel section on the surface of a display section such as a liquid crystal display (LCD) or the like. In this regard, various kinds of configurations such as an optical type, a resistance film type, a pressure sensitive type and the like can be adopted as the touch panel section. In this regard, although the video game processing system 100 is configured so that each of the user terminals 11 to 1N has a function as the touch panel in the present embodiment, it may be configured so as not to have a touch panel function.

Figures 2, 3:
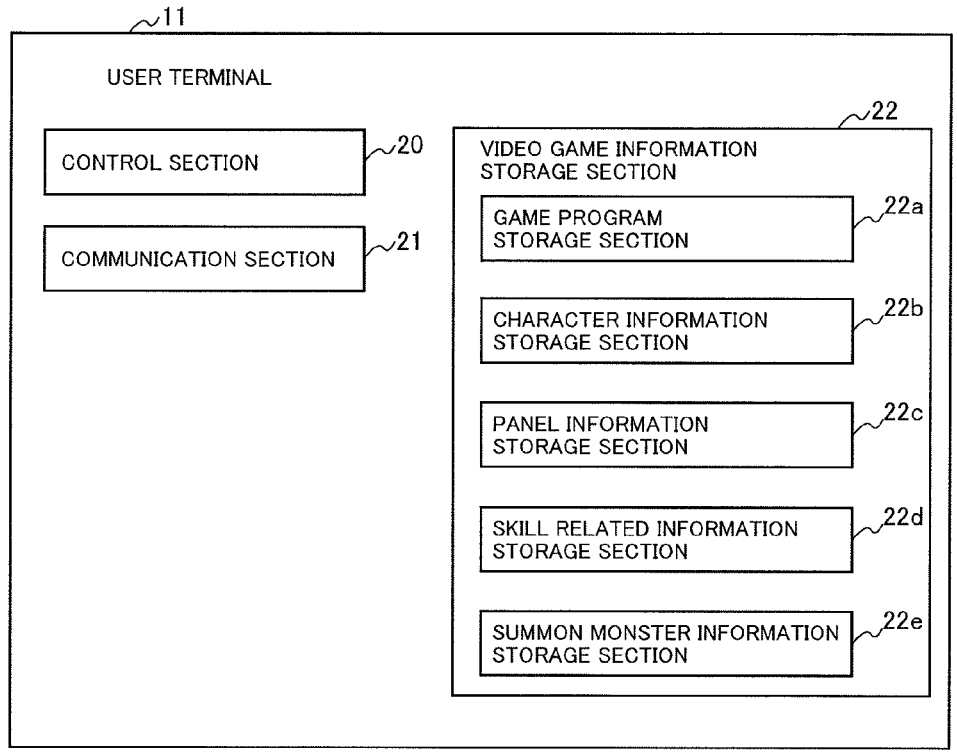
FIG. 2 is a block diagram showing an example of a configuration of a user terminal.
FIG. 3 is an explanatory drawing showing an example of a storage state of character information.

FIG. 2 is a block diagram showing an example of a configuration of the user terminal 11. The user terminal 11 includes: a control section 20; a communication section 21; and a video game information storage section 22. In this regard, although the user terminal 11 will be described as an example in the present embodiment, each of the other user terminals 12 to 1N has the similar configuration to the configuration that the user terminal 11 has.

The control section 20 includes a CPU, a ROM and the like, and has a function to control the whole user terminal 11 in accordance with a control program stored in the video game information storage section 22.

The communication section 21 has a function to communicate among the plurality of the user terminals 11 to 1N via the communication network 40 such as the Internet or the like.

The video game information storage section 22 is configured by a database apparatus, for example. The video game information storage section 22 is a storage medium for storing various kinds of information regarding the video game whose progress is controlled by the video game processing system 100 and various kinds of data such as the control program for the video game. However, the video game processing system 100 may be configured so that part of the information regarding the video game is managed by each of the plurality of the user terminals 11 to 1N.

The video game information storage section 22 includes: a game program storage section 22a; a character information storage section 22b; a panel information storage section 22c; a skill related information storage section 22d; and a summon monster information storage section 22e (see FIG. 2).

The character information storage section 22b is a storage medium for storing character information regarding various kinds of characters for carrying out battle processing. FIG. 3 is an explanatory drawing showing an example of a storage state of the character information. As shown in FIG. 3, the character information contains: a character type indicating a player character or an enemy character; a character ID for uniquely specifying a character; a character name; an appearance mode of the character; a job of the character; and a status of the character.

Here, the job is attribute information indicating an attribute of the player character. In the present embodiment, the player character is sorted into any one of jobs including a fighter, a soldier, a magician, a priest and the like. In this regard, the video game processing system 100 may be configured so that the job is set to only the player character or the job is set to each of characters including the player character and an enemy character.

The panel information storage section 22c is a storage medium for storing panel information regarding a display object. The user is caused to select any of display objects in order to carry out the battle processing. FIG. 4 is an explanatory drawing showing an example of a storage state of the panel information. As shown in FIG. 4, the panel information contains a pattern (or picture), a job and an action.

Here, the pattern is information indicating a display mode of a panel. The pattern according to the present embodiment is stored as any of a "fist", a "sword", a "wand" and a "cross". In this regard, the pattern according to the present embodiment corresponds to the job indicating an attribute.

Here, the action content is information indicating the content of an action that the player character is caused to carry out in the battle processing. The action content according to the present embodiment is stored as any of "attack a single enemy with a fist", "attack a single enemy with a sword" and "attack a single enemy with a magic". In this regard, the video game processing system 100 may be configured so that: the action content is associated with the number of panels selected by the user in the battle processing; and the control section 20 specifies the number of panels selected by the user and refers to the panel information to determine the action content corresponding to the number of panels as the action content of the character.

The skill related information storage section 22d is a storage medium for storing skill related information regarding a skill as one of attack methods of the player character. The skill (skill information) according to the present embodiment indicates information defined in advance for carrying out special attack action processing. In the special attack action processing, a special attack contained in attacks by the player character is carried out. FIG. 5 is an explanatory drawing showing an example of a storage state of skill related information. As shown in FIG. 5, the skill related information contains: a character ID; a skill ID for uniquely specifying the skill; the skill content; a skill activating condition; a skill count value; and a skill activating representation.

Here, the skill activating condition is information indicating an activating condition for a skill (a condition to activate a skill). As shown in FIG. 5, the skill activating condition according to the present embodiment is stored for a "player character 1" whose attribute is set to a "fist" as a condition "attribute: first/skill count value: five or more/panel selection number: five or more". Further, the skill activating condition is stored for a "player character 2" whose attribute is set to "sword" as a condition "attribute: sword/skill count value: five or more/panel selection number: five or more". Moreover, the skill activating condition is stored for a "player character 3" whose attribute is set to "wand" as a condition "attribute: wand/skill count value: five or more/panel selection number: five or more". Furthermore, the skill activating condition is stored for a "player character 4" whose attribute is set to "cross" as a condition "attribute: cross/skill count value: five or more/panel selection number: five or more". Namely, the video game processing system 100 according to the present embodiment is configured so that a skill is activated "when the skill count value is '5' and attack processing by the player character is carried out by selecting five or more panels each having the same attribute as the attribute of the player character whose skill count value is '5'". In this regard, processing to activate a skill (skill activation action processing) will be described later in detail.

Here, the skill count value (count value) is information that is stored and updated so as to be associated with each character, and is also information related to a skill activating condition. The skill count value is displayed in the vicinity of a display position of the player character on a battle screen. In the present embodiment, the minimum value and the maximum value of the skill count value are set to "3" and "5", respectively. The video game processing system 100 according to the present embodiment is configured so that the player character satisfies one of requirements in the skill activating condition when the skill count value becomes "5". In this regard, the processing to activate a skill will be described later in detail.

The summon monster information storage section 22e is a storage medium for storing summon monster information regarding a summon monster. The summon monster is used as one method of an attack by the player character. The summon monster information according to the present embodiment is information defined in advance for carrying out the special attack action processing in which the special attack different from the attack by the player character is carried out. FIG. 6 is an explanatory drawing showing an example of a storage state of the summon monster information. As shown in FIG. 6, the summon monster information contains: a summon monster ID for uniquely specifying a summon monster; an attribute corresponding to the summon monster; the action content of the summon monster; a display mode; a status; summon operation information; and a summon monster activating representation.

Here, the summon operation information is information indicating an operation method of summoning the summon monster. In the present embodiment, the summon operation information contains operations "↓", "←", "→", "↑", and the like. Here, the operation "↓" indicates an "input operation toward a lower end side from an upper end side" in an area in which the user can operate. Further, the operation "←" indicates an "input operation toward a left end side from a right end side" in the area in which the user can operate. Moreover, the operation "→" indicates an "input operation toward the right end side from the left end side" in the area in which the user can operate. Furthermore, the operation "↑" indicates an "input operation toward the upper end side from the lower end side" in the area in which the user can operate. In this regard, although the summon operation information contains the operations "↓", "←", "→", "↑" in the present embodiment, any operation method, such as an operation "S-shaped" and an operation "U-shaped", can be adopted.

Here, the status is information indicating an offensive power of a summon monster, an additional effect to be generated for the player character or an enemy character after an attack, and the like.

Each of the video game processing server 30 and the plurality of user terminals 11 to 1N is connected to a communication network 40 such as the Internet. In this regard, although it is not shown in the drawings, each of the plurality of user terminals 11 to 1N is connected to the communication network 40 by carrying out data communication with a base station managed by a carrier by means of a wireless communication line.

The video game processing system 100 has various kinds of functions to control progress of a video game (for example, a so-called online game and a social game (that is, a video game provided in an SNS (Social Networking Service)). Each of a plurality of players plays the video game in a virtual space or a virtual area.

The video game processing server 30 is managed by an administrator of the video game processing system 100. The video game processing server 30 has various kinds of functions to provide information regarding the video game to the user terminals 11 to 1N.

The video game processing server 30 is configured by an information processing apparatus such as a WWW server or the like. The video game processing server 30 includes a storage medium for storing various kinds of information.

Next, an operation of the video game processing system 100 according to the present embodiment will be described. In this regard, the content of operations and/or processing with no relationship to the present invention may be omitted.

Figure 7:
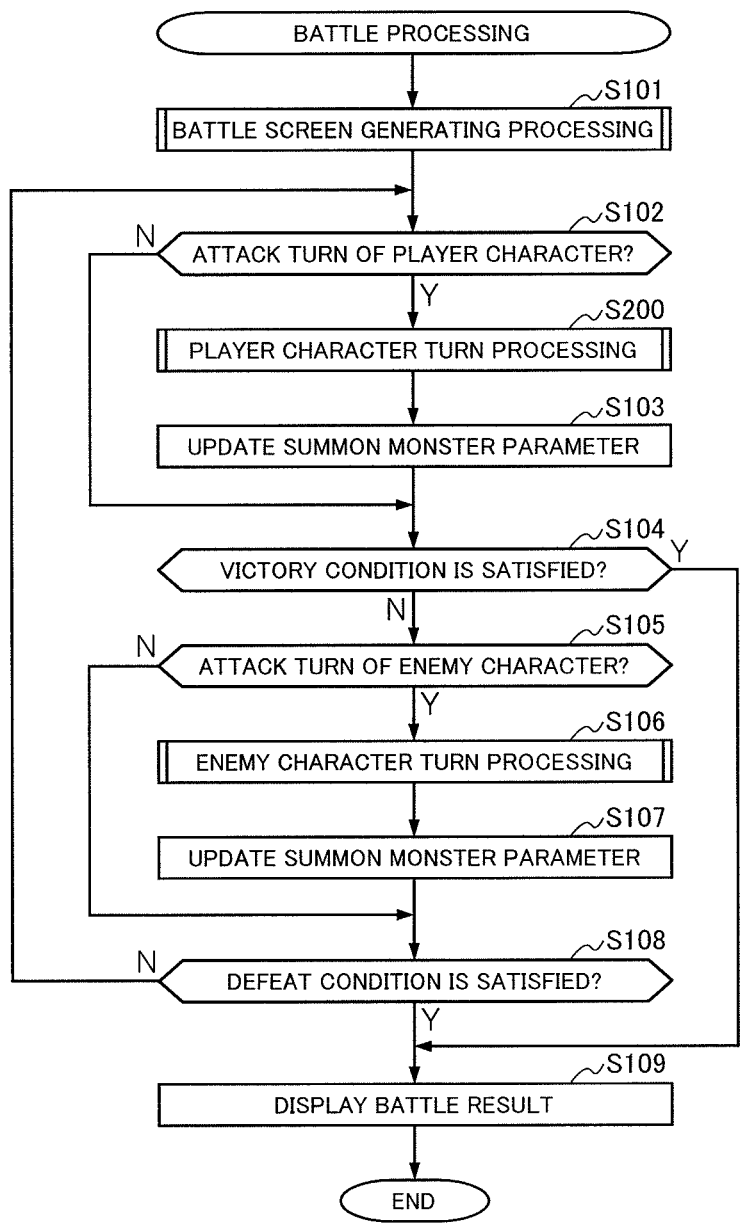
FIG. 7 is a flowchart showing an example of battle processing.

FIG. 7 is a flowchart showing an example of battle processing carried out by the user terminal 11 in the video game processing system 100. In the present embodiment, the battle processing is started in a case where the control section 20 of the user terminal 11 receives a battle start operation from the user during progress of the video game. In this regard, the video game processing system 100 according to the present embodiment carries out a turn-based battle system. When turn processing for the player character is started, the video game processing system 100 causes the user to carryout a puzzle game and carries out attack processing by the player in accordance with a result of the puzzle game thus caused to carry out. In this regard, the video game processing system 100 may be configured so that the video game processing server 30 carries out part of the processing shown in FIG. 7 or any of the user terminals 12 to 1N carries out the part of the processing shown in FIG. 7.

In the battle processing, the control section 20 first carries out battle screen generating processing (Step S101). Namely, the control section 20 generate a battle screen, and causes the display device of the user terminal 11 to display the generated battle screen.

Figure 8:
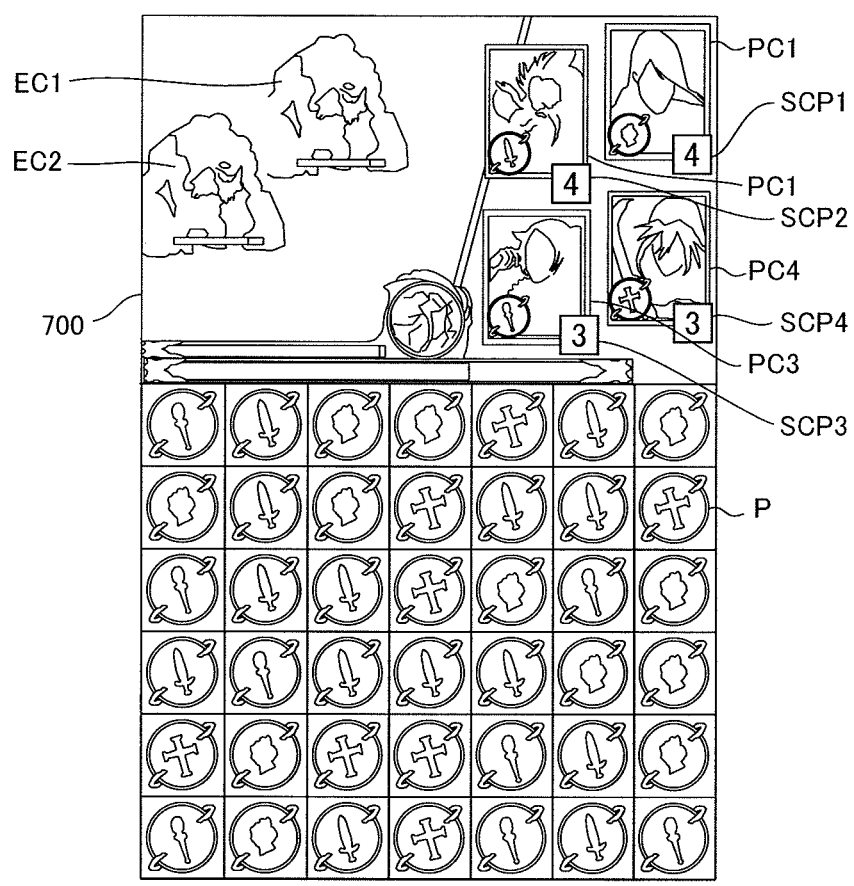
FIG. 8 is a screen drawing showing an example of a battle screen.

FIG. 8 is a screen drawing showing an example of a battle screen. As shown in FIG. 8, a battle screen 700 includes a plurality of objects. Namely, the battle screen 700 includes player characters PC1 to PC4, enemy characters EC1 to EC2, and a plurality of panels P. The player characters PC1 to PC4 according to the present embodiment are displayed as cards, respectively. Further, the battle screen 700 includes a character arrangement area in which the respective characters are arranged and a panel arrangement area in which the respective panels are arranged. Each of the panels arranged in the panel arrangement area is selectably arranged in a predetermined arrangement pattern. Namely, the user terminal 11 causes the display device to selectably display the plurality of panels within a predetermined are of a display screen in the predetermined arrangement pattern. Total 42 pieces of panels in a matrix with six rows and seven columns are arranged in the panel arrangement area according to the present embodiment.

Further, the battle screen 700 includes skill count values SCP1 to SCP4 respectively corresponding to the player characters PC1 to PC4. The video game processing system 100 may be configured so that the control section 20 refers to the skill related information to determine a skill count value to be set up to each player character at random when to generate a battle screen. Alternatively, the video game processing system 100 may be configured so as to store a skill count value when previous battle processing is terminated; and take over the skill count value from the previous battle processing.

When the battle screen generating processing is carried out, the control section 20 determines whether it is an attack turn of the player character or not (Step S102). In a case where it is determined that it is not the attack turn of the player character ("No" at Step S102), the control section 20 determines whether a victory condition is satisfied or not (Step S104).

On the other hand, in a case where it is determined that it is the attack turn of the player character ("Yes" at Step S102), the control section 20 carries out player character turn processing (Step S200).

Figure 9:
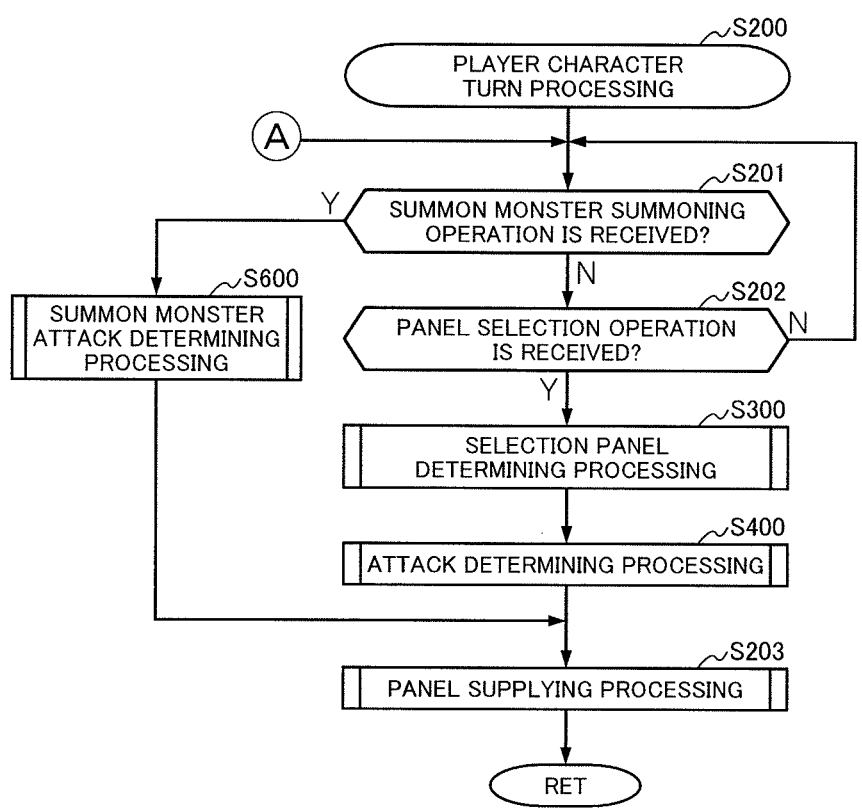
FIG. 9 is a flowchart showing an example of player character turn processing.

FIG. 9 is a flowchart showing an example of the player character turn processing.

In the player character turn processing, the control section 20 first determines whether a summon monster summoning operation is received or not (Step S201). In a case where it is determined that a summon monster summoning operation is received from the user ("Yes" at Step S201), the control section 20 carries out summon monster attack determining processing (Step S600). The summon monster attack determining processing will be described later in detail.

On the other hand, in a case where it is determined that a summon monster summoning operation is not received from the user ("No" at Step S201), the control section 20 determines whether a panel selection operation is received from the user or not (Step S202).

In a case where it is determined that a panel selection operation is not received from the user ("No" at Step S202), the control section 20 causes the processing flow to proceed to Step S201, and determines whether a summon monster summoning operation is received from the user or not again.

On the other hand, in a case where it is determined that a panel selection operation is received from the user ("Yes" at Step S202), the control section 20 carries out selection panel determining processing (Step S300). The selection panel determining processing will be described later in detail.

When the selection panel determining processing is terminated and the panel selected by the user is determined, the control section 20 carries out attack determining processing (Step S400). The attack determining processing will be described later in detail.

When the attack determining processing is terminated and the attack processing by the player character is terminated, the control section 20 carries out panel supplying processing to supply (or replenish the panel arrangement area with) panel(s) (Step S203).

When the panel supplying processing is terminated, the control section 20 terminates the player character turn processing, and proceeds to the processing flow of the battle processing.

When panels are supplied and the player character turn processing is terminated, the control section 20 updates a summon monster parameter (Step S103). Namely, the control section 20 updates the summon monster parameter in accordance with a variation result of the parameter. In this regard, the video game processing system 100 may be configured so that the summon monster parameter is not changed in the process to update the summon monster parameter that is carried out at Step S103 when the summon monster attack determining processing is carried out.

Figure 10:
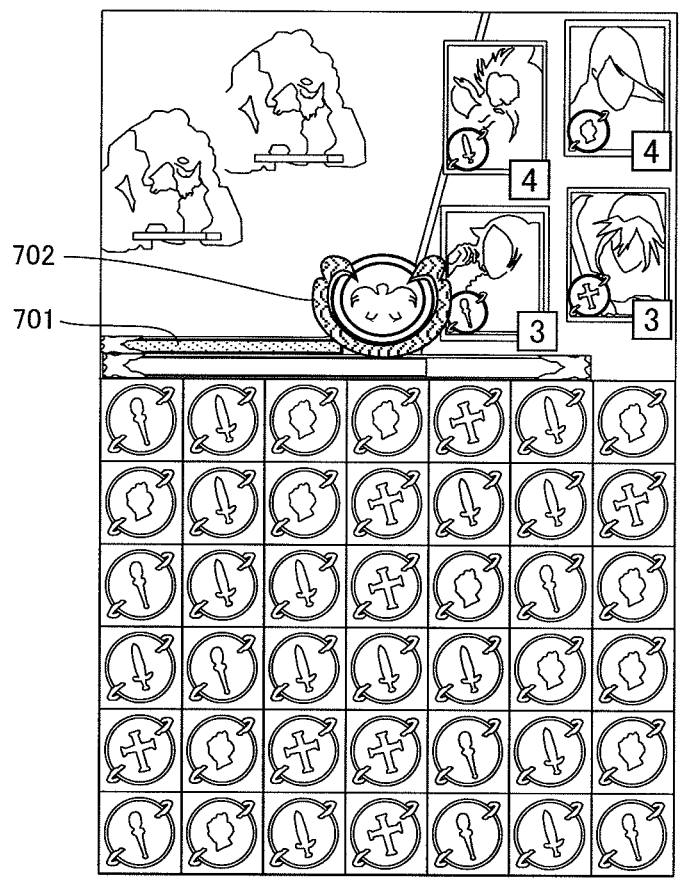
FIG. 10 is a screen drawing showing an example of the battle screen on which a summon monster button is displayed.

FIG. 10 is a screen drawing showing an example of the battle screen on which a summon monster button is displayed. As shown in FIG. 10, the battle screen includes a summon monster gauge 701 and a summon monster button 702. The summon monster gauge 701 is a gauge corresponding to the summon monster parameter. In the present embodiment, the control section 20 adds a predetermined value according to the amount of damage applied to the enemy character by the player character to the summon monster parameter. The control section 20 then updates the summon monster gauge in accordance with the added summon monster parameter and causes the display device to display the updated summon monster gauge. Further, the control section 20 determines, when the summon monster parameter is updated, whether the updated summon monster parameter exceeds a predetermined value or not. The control section 20 causes the display device to display the summon monster button 702 on the display screen (battle screen) in a case where it is determined that the updated summon monster parameter exceeds the predetermined value.

When the summon monster parameter is updated, the control section 20 determines whether the victory condition is satisfied or not (Step S104).

In a case where it is determined that the victory condition is satisfied ("Yes" at Step S104), the control section 20 causes the display device to display a battle result (Step S109).

On the other hand, in a case where it is determined that the victory condition is not satisfied ("No" at Step S104), the control section 20 determines whether it is an attack turn of the enemy character or not (Step S105).

In a case where it is determined that it is not the attack turn of the enemy character ("No" at Step S105), the control section 20 determines whether a defeat condition is satisfied or not (Step S108).

On the other hand, in a case where it is determined that it is the attack turn of the enemy character ("Yes" at Step S105), the control section 20 carries out enemy character turn processing (Step S106). In the enemy character turn processing according to the present embodiment, the control section 20 specifies an enemy character that carries out an attack; refers to the character information to calculate an attack target and a damage amount; carries out an attack representation against the player character on the basis of the attack target and the damage amount thus calculated; and refers to the character information to carries out processing to subtract an HP of the player character.

When the enemy character turn processing is carried out, the control section 20 updates the summon monster parameter (Step S107). Namely, the control section 20 updates the summon monster parameter in accordance with the variation result of the parameter. The processing to update the summon monster parameter carried out by the control section 20 is carried out so that a predetermined value is added into the summon monster parameter in accordance with the amount of damage applied to the player character by the enemy character, for example. Further, the control section 20 determines whether the updated summon monster parameter exceeds the predetermined value when the summon monster parameter is updated; and causes the display device to display the summon monster button on the display screen (or the battle screen) in a case where it is determined that the summon monster parameter exceeds the predetermined value.

When the summon monster parameter is updated, the control section 20 determine whether the defeat condition is satisfied or not (Step S108).

In a case where it is determined that the defeat condition is not satisfied ("No" at Step S108), the control section 20 causes the processing flow to proceed to Step S102, and determines whether it is the attack turn of the player character or not.

On the other hand, in a case where it is determined that the defeat condition is satisfied ("Yes" at Step S108), the control section 20 causes the display device to display a battle result (Step S109). When the battle result is displayed, the control section 20 terminates the battle processing.

Figure 11:
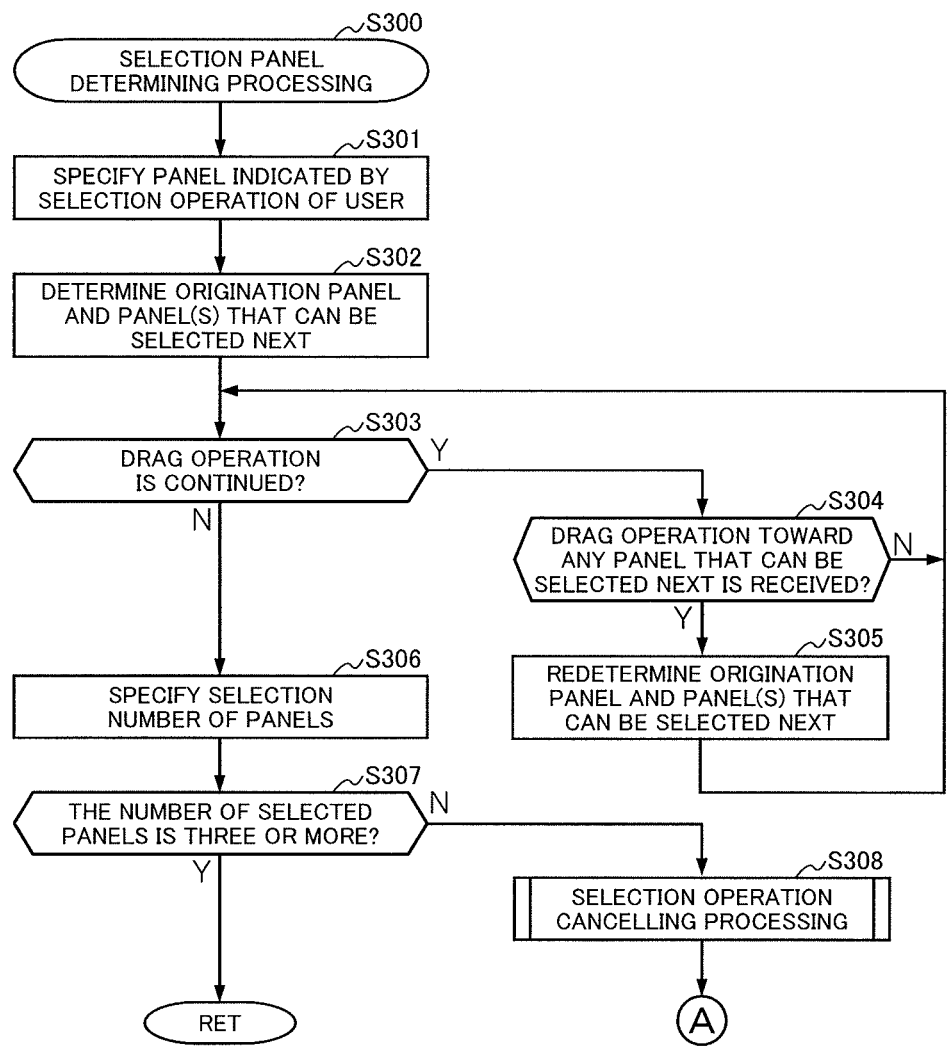
FIG. 11 is a flowchart showing an example of selection panel determining processing.

Next, an example of the selection panel determining processing will be described using the drawing. FIG. 11 is a flowchart showing an example of the selection panel determining processing. The selection panel determining processing is started when a selection operation against any panel within the panel arrangement area is received from the user. Namely, the control section 20 carries out the selection panel determining processing by receiving a drag operation as the selection operation of a panel within the panel arrangement area from the user.

In the selection panel determining processing, the control section 20 first specifies the panel indicated by the selection operation of the user (Step S301). Namely, the control section 20 receives a touch operation onto the touch panel toward the panel arranged in the panel arrangement area from the user, and specifies the panel indicated by the received touch operation. In this regard, although the video game processing system 100 is configured so as to receive a drag operation based on the touch operation toward the touch panel from the user in the present embodiment, the video game processing system 100 maybe configured so as to receive a drag operation by means of a mouse.

When the panel indicated by the selection operation of the user is specified, the control section 20 determines the specified panel as an origination panel, and specifies at least one panel that can be selected sequentially in correspondence with the origination panel (that is, panel(s) that can be selected next) (Step S302). Namely, the control section 20 specifies panel(s) that can be selected sequentially in accordance with the panel indicated by the selection operation of the user.

In the present embodiment, the control section 20 refers to the panel information storage section 22*c* for storing the panel information that contains attribute information indicating an attribute of the panel, and specifies the panel(s) that can be selected sequentially on the basis of the attribute of the panel selected by the user and a predetermined rule. In the present embodiment, the video game processing system 100 is configured so that the control section 20 specifies panel(s) having the same attribute as the attribute of the panel selected by the user and adjacent to the selected panel as panels that can be selected sequentially. Namely, in the present embodiment, the control section 20 panel stores a rule "the same attribute as the attribute of the selected by the user and adjacent to the selected panel" as the predetermined rule. In this regard, the video game processing system 100 may be configured so that the control section 20 specifies a panel having the same attribute as the attribute of the selected by the user as a panel that can be selected sequentially. Further, the video game processing system 100 may be configured so that the control section 20 specifies a panel having a different attribute from the attribute of the panel selected by the user as a panel that can be selected sequentially. Further, the video game processing system 100 may be configured so that the control section 20 specifies panels adjacent to the panel selected by the user as a panel that can be selected.

When the origination panel is determined and the panel(s) that can be selected next is also determined, the control section 20 determines whether the drag operation received from the user as the selection operation of the panel is continued or not (Step S303).

In a case where it is determined that the drag operation received from the user as the selection operation of the panel is continued ("Yes" at Step S303), the control section 20 determines whether a drag operation toward any panel that can be selected next is received or not (Step S304).

In a case where it is determined that the drag operation toward any panel that can be selected next is not received ("No" at Step S304), the control section 20 causes the processing flow to shift to Step S303, and determines whether the drag operation received from the user as the selection operation of the panel is continued or not again.

On the other hand, in a case where it is determined that the drag operation toward any panel that can be selected next is received ("Yes" at Step S304), the control section 20 redetermines an origination panel and panel(s) that can be selected next (Step S305). Namely, the control section 20 determines the panel indicated by the drag operation (that is, the panel selected by the user) as a next origination panel, and determines the panel(s) that can be selected next on the basis of the next origination panel.

When the next origination panel and the panel(s) that can be selected next are redetermined, the control section 20 determines whether the drag operation received from the user as the selection operation of the panel is continued or not again (Step S303).

Subsequently, in a case where it is determined that the drag operation is not continued ("No" at Step S303), the control section 20 specifies the number of panels thus selected by the user (Step S306). Namely, the control section 20 specifies the panel indicated by the selection operation (that is, the drag operation) received from the user, and specifies the selection number of the specified panels.

When the number of selected panels is specified, the control section 20 determines whether the number of the selected panels (hereinafter, also referred to as the "selection panel") is three or more or not (Step S307). In this regard, the video game processing apparatus 100 according to the present embodiment is configured so as to shift to the attack determining processing in a case where the number of selected panels becomes three or more. However, this condition is not limited to the condition "the number of selected panels becomes three or more". For example, the video game processing apparatus may be configured so as to shift to the attack determining processing in a case where the number of selected panels becomes less than three.

In a case where it is determined that the number of selected panels is not three or more ("No" at Step S307), the control section 20 carries out selection operation cancelling processing (Step S308). Namely, the control section 20 cancels the processing that was already carried out in the player character turn processing, and causes the display device to display the battle screen that was displayed when the player character turn processing is started.

On the other hand, in a case where it is determined that the number of selected panels becomes three or more ("Yes" at Step S307), the control section 20 determines the selected panel as a panel used in the attack determining processing for a player character turn; returns to the processing flow of the player character turn processing; and causes the processing flow to shift to the attack determining processing (Step S400). Namely, the control section 20 determines the selected panel as the selection panel, and terminates the selection panel determining processing.

Figure 12:
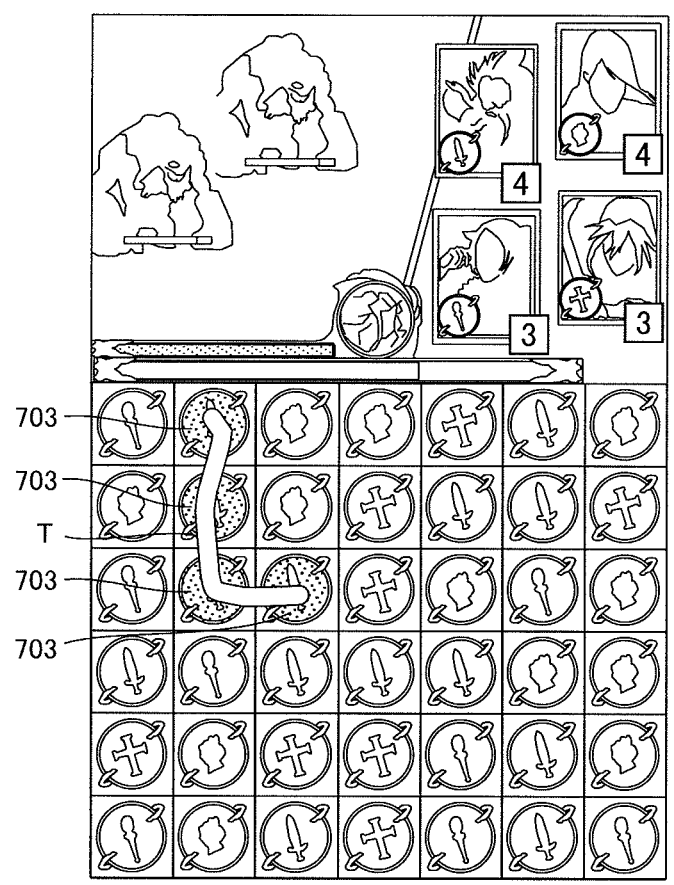
FIG. 12 is a screen drawing showing an example of the battle screen on which a selection panel is determined.

FIG. 12 is a screen drawing showing an example of the battle screen on which a selection panel is determined. In a case where four panels each having a pattern (attribute) "sword" are selected by the user as shown in FIG. 12, the control section 20 determines the four panels as selection panels 703. In this regard, in the processing carried out in the player character turn processing according to the present embodiment, the control section 20 causes the display device to display a trajectory T of the drag operation to the inside of the panel arrangement area received from the user so as to superimpose the trajectory T on the battle screen.

Figure 13:
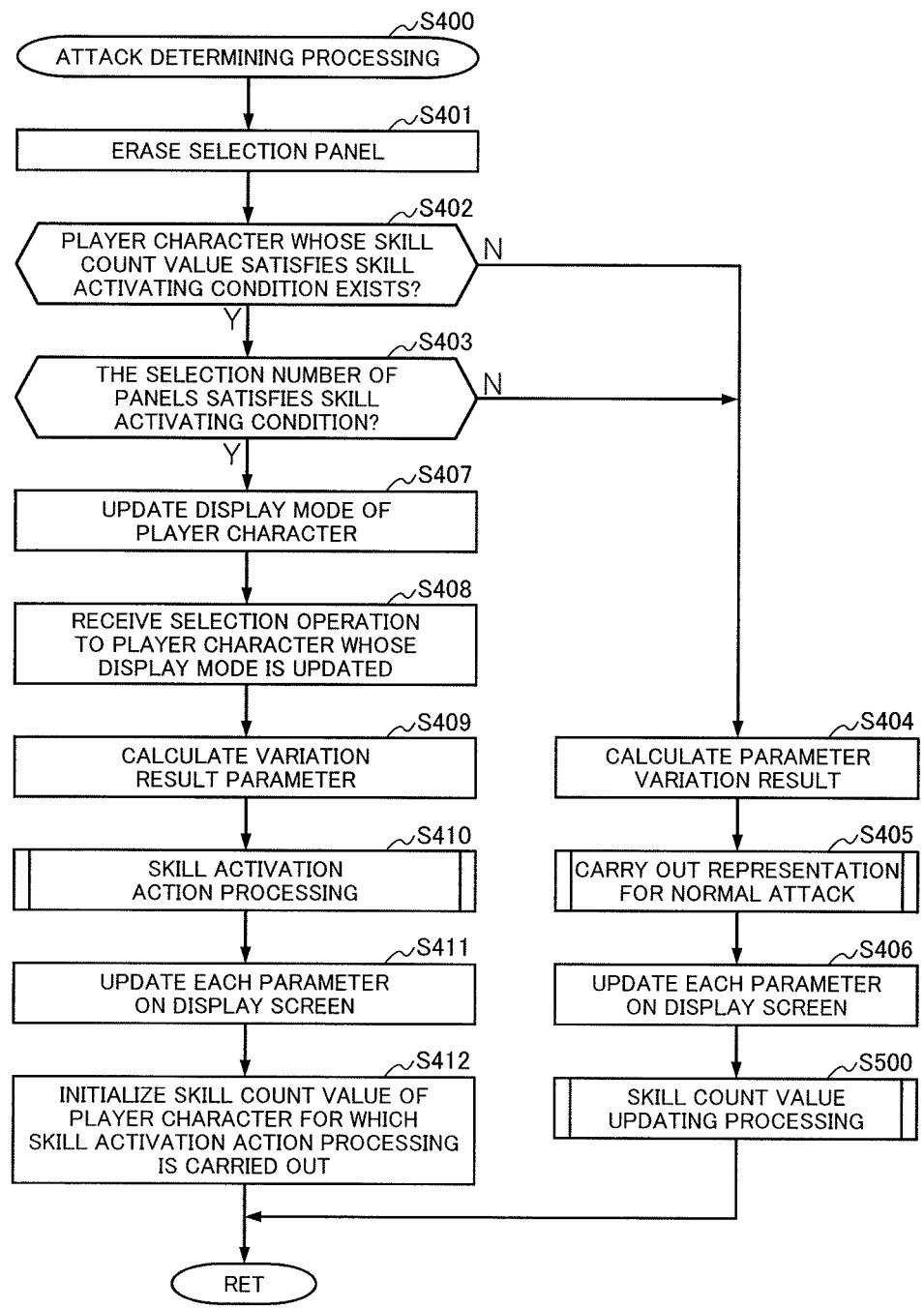
FIG. 13 is a flowchart showing an example of attack determining processing.

Subsequently, an example of the attack determining processing will be described with reference to the drawing. FIG. 13 is a flowchart showing an example of the attack determining processing. The attack determining processing is started after the selection panel(s) (selected panels) are determined in the selection panel determining processing.

In the attack determining processing, the control section 20 first erases the panel(s) determined as the selection panel in the selection panel determining processing (Step S401).

When the selection panel is erased, the control section 20 refers to the skill related information to determine whether a player character whose skill count value satisfies the skill activating condition exists or not (Step S402). In a case where it is determined that a player character whose skill count value satisfies the skill activating condition exists ("Yes" at Step S402), the control section 20 determines whether the selection number of panels determined in the selection panel determining processing satisfies the skill activating condition or not (Step S403). Namely, the control section 20 refers to the skill related information to determine whether both the specified selection number of panels and the skill count value satisfy the skill activating condition or not.

In a case where it is determined that no player character whose skill count value satisfies the skill activating condition exists ("No" at Step S402), the control section 20 calculates a variation result of the parameter (Step S404). Further, in a case where it is determined that the selection number of panels determined in the selection panel determining processing does not satisfy the skill activating condition ("No" at Step S403), the control section 20 also calculates the variation result of the parameter (Step S404). More specifically, the control section 20 specifies the attribute of the selection panel (selected panel); and refers to a status of the player character corresponding to the specified attribute and a status of the enemy character to calculate a variation result of each of various kinds of parameters such as a damage amount applied to the enemy character or a recovery amount to the player character.

When the variation results of the parameters are calculated, the control section 20 carries out a representation for a normal attack (a normal attack representation) (Step S405). Here, the normal attack denotes a normal attack by the player character (in the present embodiment, the action content contained in the panel information). Namely, the control section 20 carries out a representation indicating an action, such as "attack a single enemy with a fist", "attack a single enemy with a sword", and "attack a single enemy with a magic". More specifically, in a case where four panels each having an attribute "sword" are selected as shown in FIG. 12 and the character information shown in FIG. 3 is stored, the player character 2 with the attribute "sword" "attacks the enemy character (a single enemy) with a sword".

When the normal attack representation is carried out, the control section 20 causes the display device to display the variation result of the parameter. Namely, the control section 20 updates the parameter of each of the player character and the enemy character, which is displayed on the display screen, on the basis of the calculated variation result of the parameter (Step S406), and causes the display device to display the updated parameters.

When the variation result of the parameter is displayed, the control section 20 carries out skill count value updating processing (Step S500).

Figure 14:
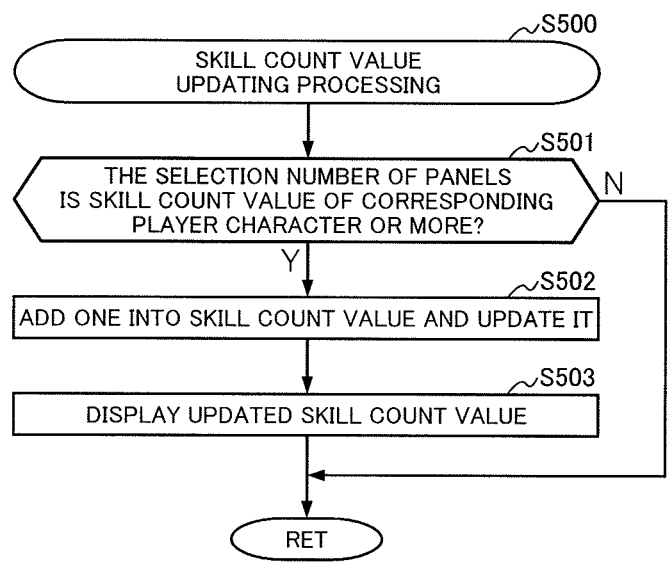
FIG. 14 is a flowchart showing an example of skill count value updating processing.

FIG. 14 is a flowchart showing an example of the skill count value updating processing. In the present embodiment, the control section 20 carries out the skill count value updating processing for only the player character with the same attribute as the selected panel (the panel used in the normal attack). In this regard, the video game processing system 100 maybe configured so as to carry out skill count value updating processing for each of all characters regardless of the attribute (or job) of the player character.

In the skill count value updating processing, the control section 20 first determines whether the selection number of panels specified in the selection panel specifying processing is the skill count value or more or not (Step S501).

In a case where it is determined that the selection number of panels specified in the selection panel specifying processing is not the skill count value or more ("No" at Step S501), the control section 20 terminates the skill count value updating processing, and proceeds to the processing flow of the attack determining processing.

On the other hand, in a case where it is determined that the selection number of panels specified in the selection panel specifying processing is the skill count value or more ("Yes" at Step S501), the control section 20 adds one to the skill count value, and updates the skill related information (Step S502). FIG. 15 is an explanatory drawing showing an example of a storage state of skill related information when the skill related information shown in FIG. 5 is updated. More specifically, when there is a player character whose skill count value is "4" and whose attribute is "sword" as shown in FIG. 5 and the user selects four panels each having a pattern (attribute) "sword" to carry out the normal attack action processing, the skill count value is updated from "4" to "5".

When the skill related information is updated, the control section 20 updates the skill count value to be displayed on the display screen and causes the display device to display the updated skill count value (Step S503). More specifically, the control section 20 updates the skill count value of the player character PC2 shown in FIG. 12 (player character having an attribute of a sword) from "4" to "5", and causes the display device to display the updated skill count value.

When the skill count value is updated and the updated skill count value is displayed, the control section 20 terminates the skill count value updating processing, and proceeds to the processing flow of the attack determining processing.

On the other hand, in a case where it is determined that the selection number of panels determined in the selection panel determining processing satisfies the skill activating condition ("Yes" at Step S403), the control section 20 updates a display mode of the player character that satisfies the skill activating condition (Step S407). For example, the control section 20 highlights the player character on the battle screen. FIG. 16 is a screen drawing showing an example of the battle screen on which the player character is highlighted. More specifically, in a case where the skill related information shown in FIG. 15 is stored (that is, in a case where there is a player character whose skill count value becomes "5") and five panels each having a pattern (attribute) "sword" are then selected by the user, the player character is highlighted as shown in FIG. 16. In this regard, in the present embodiment, the video game processing system 100 is configured so that it is timing to highlight the player character when it is determined that the selection number of panels satisfies the skill activating condition (that is, the video game processing system 100 is configured so as to highlight the player character just before the skill is activated). However, the video game processing system 100 may be configured so as to highlight the player character when the skill count value of the player character becomes a skill count value that satisfies the skill activating condition.

When the display mode of the player character that satisfies the skill activating condition is updated, the control section 20 receives a selection operation to the player character whose display mode is updated on the display screen from the user (Step S408).

When the selection operation for the player character highlighted on the display screen is received from the user, the control section 20 calculates a variation result of the parameter (Step S409). More specifically, the control section 20 refers to the skill related information and the character information, and calculates the amount of damage applied to the enemy character using a status of the player character that activates a skill, an effect of the skill and a predetermined calculation formula. In this regard, since the activation results of the skills are different from each other, a calculation formula for the parameter is changed in accordance with the activation result.

When the variation result of the parameter is calculated, the control section 20 carries out skill activation action processing (Step S410). More specifically, the control section 20 refers to an activation representation contained in the skill related information to carry out the skill activation action processing.

When the skill activation action processing is carried out, the control section 20 causes the display device to display the variation result of the parameter. Namely, the control section 20 updates the parameter of each of the player character and the enemy character, which is displayed on the display screen, on the basis of the calculated variation result of the parameter (Step S411), and causes the display device to display the updated parameters.

When the variation result of the parameter is displayed, the control section 20 restores the skill count value to an initial state ("3" in the present embodiment); updates the skill related information; and updates the skill count value to be displayed on the battle screen on the basis of the updated skill related information (Step S412).

When the skill count value is updated, the control section 20 terminates the attack determining processing; causes the processing flow to return to the player character turn processing; and carries out the panel supplying processing (Step S203).

Figure 17:
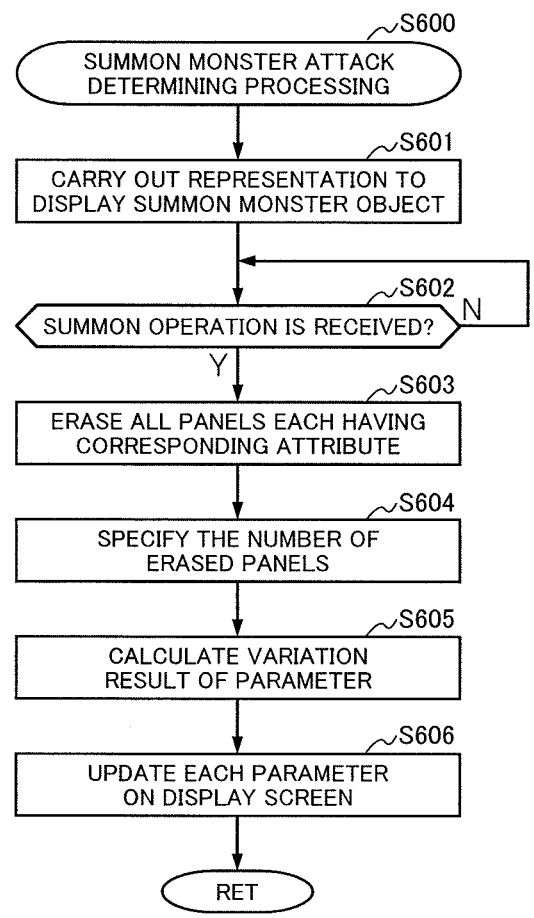
FIG. 17 is a flowchart showing an example of summon monster attack determining processing.

Subsequently, an example of summon monster attack determining processing will be described with reference to the drawing. FIG. 17 is a flowchart showing an example of the summon monster attack determining processing. The summon monster attack determining processing is carried out in a case where a summon monster summoning operation is received from the user. More specifically, the control section 20 carries out the summon monster attack determining processing in a case where a selection operation against the summon monster button 702 displayed on the display screen, as shown in FIG. 10, is received from the user.

In the summon monster attack determining processing, the control section 20 first causes the display device to display a summon monster object in the panel arrangement area (Step S601).

Figure 18:
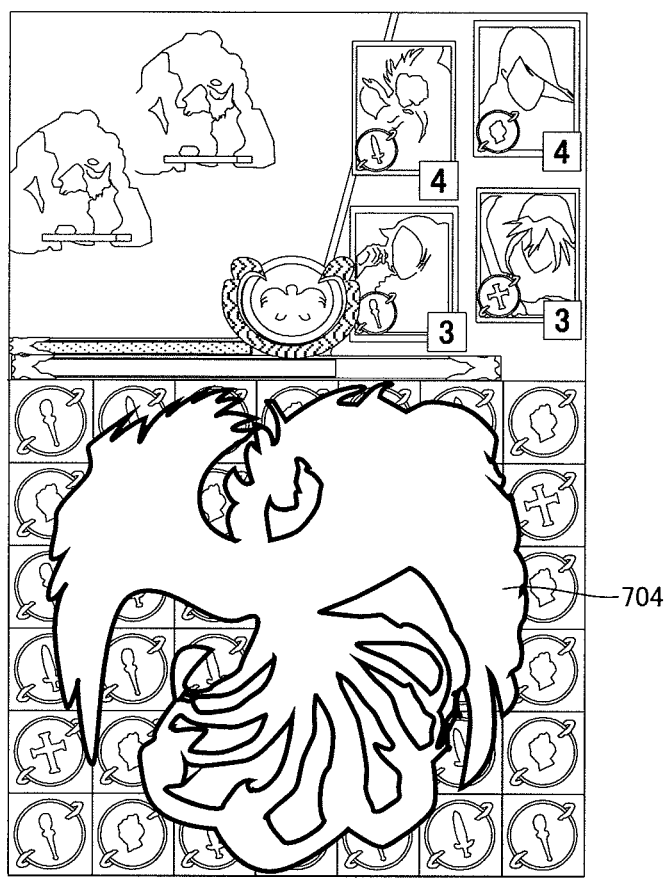
FIG. 18 is a screen drawing showing an example of the battle screen on which a summon monster object is displayed.

FIG. 18 is a screen drawing showing an example of the battle screen on which the summon monster object is displayed. As shown in FIG. 18, a summon monster object 704 corresponding to the summon monster that can be summoned by the user is displayed in the panel arrangement area. In this regard, the video game processing system 100 may be configured so that: the summon monster that can be summoned is determined in advance before the start of a battle; the summon monster is determined at random from among plural kinds of summon monsters by referring to the summon monster information when the summon monster button is displayed; or the summon monster is determined at random from among plural kinds of summon monsters by referring to the summon monster information when the summon monster button is pressed.

When the summon monster object is displayed, the control section 20 receives an input operation from the user, and determines whether the operation received from the user is an operation to summon a summon monster or not (Step S602). More specifically, in a case where the summon monster summoned in the present embodiment is a "summon monster 2", the control section 20 refers to the summon monster information, and determines whether an operation to summon a "summon monster 2", that is, "← (i.e., the input operation toward the left end side to the right end side)" is received or not.

In a case where it is determined that an operation to summon a summon monster is not received ("No" at Step S602), the control section 20 causes the processing flow to shift to Step S602, and receives an input operation from the user again.

On the other hand, in a case where it is determined that the operation received from the user is an operation to summon a summon monster ("Yes" at Step S602), the control section 20 refers to the summon monster information, and erases all of panels each having an attribute corresponding to the summon monster to be summoned (Step S603).

When all of the panels with the attribute corresponding to the summon monster is erased, the control section 20 specifies the number of erased panels (Step S604).

When the number of s panels is specified, the control section 20 calculates a variation result of the parameter according to the number of erased panels (Step S605), and updates the character information. In this regard, in the present embodiment, the control section 20 calculates a variation result of an HP of the enemy character by the summon monster attack action processing, a variation result of the summon monster parameter displayed as the summon monster gauge, and the like.

When the variation result of the parameter is calculated and the character information is then updated, the control section 20 updates each parameter to be displayed on the battle screen (the display screen) on the basis of the variation result of the corresponding parameter (Step S606). When each parameter to be displayed on the battle screen is updated, the control section 20 terminates the summon monster attack determining processing.

Namely, the user terminal 11 according to the present embodiment is configured so as to: include the summon monster information storage section 22e for storing the summon monster information, the summon monster information containing the summon monster that can be summoned in accordance with progress of the video game, the action content of the summon monster and the summon operation information indicating the operation method of summoning the summon monster; determine whether the summon monster can be summoned or not; cause the display device to display a predetermined push button (for example, summon monster button) on the display screen in a case where it is determined that the summon monster can be summoned; receive a push input to the predetermined push button; cause the display device to display an object (for example, the summon monster object) of the summon monster that can be summoned on the display screen when the push input is received; refer to the summon monster information to receive a summon operation to the summon monster from the user; and refer to the summon monster information to carry out the action processing according to the action content of the summon monster when the summon operation is received. By configuring the video game processing apparatus in this manner, it is possible to provide a new representation in a puzzle game to the user, and this makes it possible to cause the user to play the video game with higher interest of the user.

When the summon monster attack determining processing is terminated, the control section 20 causes the processing flow to return to the player character turn processing, and carries out the panel supplying processing (Step S203). In the panel supplying processing according to the present embodiment, the control section 20 carries out a panel supplying lottery for supplying panels in place of the erased panels; determine panels to be supplied by means of the panel supplying lottery; and arrange the determined panels in a line of the erased panels. Further, the control section 20 causes the display device to display the panels so as to appear from an upper frame of the panel arrangement area when the determined panels are arranged; and carries out a drop display representation in which the determined panels are displayed so as to drop to be adjacent to the panel(s) remained (or arranged) in the line to which the displayed panels are supplied. When the number of panels thus erased are supplied, the control section 20 terminates the panel supplying processing.

As explained above, in the embodiment described above, the video game processing apparatus (for example, any of the user terminals 11 to 1N or the video game processing server 30) for controlling progress of a video game while displaying an object on a display screen of a display device is configured so as to: include the skill related information storage section 22d for storing skill related information therein, the skill related information containing player character information indicating a player character, skill information indicating a skill, and a skill activating condition indicating an activating condition of the skill; cause the display device to selectably display a plurality of panels in a predetermined area of the display screen in a predetermined arrangement pattern (for example, Step S101); receive selection of at least one panel from a user of the video game processing apparatus (for example, Step S202); specify the at least one received panel (for example, Step S302 to Step S305); specify the number of specified panels (for example, Step S306); determine whether the number of specified panels satisfies the skill activating condition of the player character or not by referring to the skill related information (for example, Step S403); and carry out action processing for the skill by the player character in a case where it is determined that the number of panels satisfies the skill activating condition (for example, Step S409 to Step S411). Therefore, it is possible to provide a new video game, and this makes it possible to provide the video game with higher interest of the user.

In particular, the video game processing apparatus is configured so as to: determine whether the selection number of specified panels satisfies the skill activating condition of the player character or not (for example, Step S403); and carry out the action processing by the skill of the player character in a case where it is determined that the selection number of specified panels satisfies the skill activating condition (for example, Steps S408 to Step S410). Therefore, the user is allowed to make a strategic plan such as producing a state that panels of a predetermined number are selectably arranged in the timing when the user wants to activate the skill. Namely, by configuring the video game processing apparatus in this manner, it is possible to incorporate a strategic characteristic in the video game. For that reason, it is possible to apply profundity to the video game, and this makes it possible to provide the video game that the player can enjoy for a long time.

In this regard, in the embodiment described above, the video game processing apparatus is configured so that the skill related information contains a count value that is associated with the player character and is related to the skill activating condition, and so as to: determine whether the number of specified panels is the count value or more; update the count value in a case where it is determined that the number of specified panels is the count value or more; and determine whether the number of specified panels and the count value satisfy the skill activating condition or not. By configuring the video game processing apparatus in this manner, timing to produce arrangement of panels of a predetermined number that can be selected becomes severe or strict, and this makes it possible to provide the video game with a higher strategic characteristic. Further, the degree of difficulty to activate the skill in the timing when the user desires increases. Therefore, a game element of the video game has depth, and this makes it possible to provide the video game with higher interest of the user.

In this regard, in the embodiment described above, the video game processing apparatus is configured so that the player character information contains attribute information indicating an attribute of the player character, and so as to: include the panel information storage section 22c for storing the panel information, the panel information containing attribute information indicating an attribute of each panel; determine whether the number of specified panels is the count value or more in a case where an attribute of the specified panel and the attribute of the player character become a predetermined relationship. By configuring the video game processing apparatus in this manner, panel selection of the predetermined number for updating the skill count value is required, and this makes it possible to provide the video game with higher interest of the user.

In this regard, although it has not been mentioned particularly in the embodiment described above, the video game processing apparatus maybe configured so that the skill related information contains information on a skill activatable state indicating that the player character can activate a skill by satisfying a predetermined condition and information on a non-activatable state indicating that the player character cannot activate the skill; and so as to refer to a predetermined rule to update a state of the player character that becomes a non-activatable state to a skill activatable state in accordance with the number of specified panels. Here, each of the skill activatable state and non-activatable state is displayed in any display manner that the user can recognize whether the skill can be activated or not. Namely, the video game processing apparatus is configured so that the user can recognize a current state of the player character by displaying the player character with a predetermined color (more specifically, a color corresponding to the attribute of the player character and the like), a predetermined number (for example, a count value as the embodiment described above), a predetermined gauge and the like. By configuring the video game processing apparatus in this manner, the user is allowed to activate a skill at a variety of timing in accordance with the number of selected panels, and this makes it possible to provide the video game with higher interest of the user.

In this regard, although it has not been mentioned particularly in the embodiment described above, the video game processing apparatus may be configured so as to cause the video game to proceed using a special panel other than the normal panel. For example, the video game processing apparatus according to the present embodiment can be configured so as to include a storage section for storing special panel information that contains a "pinch panel" and a "chance panel". Here, the "pinch panel" is a panel arranged in the panel arrangement area as well as the normal panel, and is arranged in the panel arrangement area with a predetermined probability. Further, the "pinch panel" has an effect to apply a negative impact to the player character by being arranged in the panel arrangement area. The "pinch panel" is a panel that has an effect to enlarge the impact to be applied to the player character whenever a player character turn comes. Then, when the "pinch panel" is adjacent to the selection panel (selected panel) to be erased, the "pinch panel" is erased with erasing the selection panel. When the "pinch panel" is erased, the "pinch panel" is updated to a "chance panel". Here, the "chance panel" is a panel that has an effect to erase surrounding panels in the lump when the "chance panel" is selected. Power (or a level) of the "chance panel" depends upon a magnitude of an impact (or a level) of the "pinch panel" when the panels are erased. Further, the "chance panel" is dealt with as a candidate of a panel that is first selected when a player character turn is started. Namely, attack action processing in a player character turn when the attack action processing is started from selection of a normal panel is different from attack action processing in a player character turn when the attack action processing is started from selection of a "chance panel". More specifically, before the process at Step S301 in the embodiment described above, the control section 20 determines whether the selected panel is "chance panel" or not; and causes the processing flow to shift to Step S301 in a case where it is determined that the selected panel is not "chance panel". On the other hand, in a case where it is determined that the selected panel is "chance panel", the control section 20 carries out chance panel attack determining processing. In the chance panel attack determining processing, the control section 20 specifies, when a selection operation of a chance panel is received, all panels in a predetermined area in which the chance panel is centered as selection panels; erases the specified selection panels; and calculate the parameter variation result of each character on the basis of a predetermined calculation formula. Thus, the video game processing apparatus can be configured so as to cause the video game to proceed using a special panel other than the normal panel.

In this regard, the configuration of the video game processing system 100 is not limited to the configuration described above. For example, the video game processing system 100 may be configured so that the video game processing server 30 carries out a part or all of the processings, which have been explained as the processings carried out by the user terminals 11 to 1N, or any of the plurality of the user terminals 11 to 1N (for example, the user terminal 11) carries out a part or all of the processings, which have been explained as the processings carried out by the video game processing server 30 (further, including a configuration in which each of the user terminals 11 to 1N is not connected to the video game processing server 30). Further, the video game processing system 100 may be configured so that each of the user terminals 11 to 1N includes a part or all of the storage sections included in the video game processing server 30. Namely, the video game processing system 100 may be configured so that any one of the user terminal 11 and the video game processing server 30 in the video game processing system 100 includes a part or all of the functions included in the other.

INDUSTRIAL APPLICABILITY

The present invention is useful for a puzzle game in which a user is caused to select an object.

What is claimed is:

1. A video game processing apparatus for controlling progress of a video game while displaying an object on a display screen of a display device, the video game processing apparatus comprising:
- a memory for storing skill related information, the skill related information containing player character information indicating a player character, skill information indicating a skill, and a skill activating condition indicating an activating condition of the skill;
- a display controller for causing the display device to selectably display a plurality of panels in a predetermined area of the display screen in a predetermined arrangement pattern;
- a receiver for receiving selection of at least one panel displayed by the display controller from a user of the video game processing apparatus; and
- a processor for:
  - specifying the at least one panel received by the receiver;
  - specifying the number of panels received by the receiver;
  - determining whether the number of panels received by the receiver satisfies the skill activating condition of the player character by referring to the skill related information; and
  - carrying out action processing for the skill by the player character in a case where the number of panels satisfies the skill activating condition.

2. The video game processing apparatus according to claim 1, wherein
- the skill related information contains a count value that is associated with the player character and is related to the skill activating condition,
- the processor is further for:
  - determining whether the number of panels received by the receiver is at least the count value; and
  - updating the count value in a case where the number of panels is at least the count value, and
- the processor determines whether the number of panels received by the receiver and the count value satisfy the skill activating condition.

3. The video game processing apparatus according to claim 2, wherein
- the memory is further for storing panel information, the panel information containing attribute information indicating an attribute of a panel,
- the player character information contains attribute information indicating an attribute of the player character, and
- the processor determines whether the number of panels received by the receiver is at least the count value in a case where the attribute of the panel received by the receiver and the attribute of the player character become a predetermined relationship.

4. A non-transitory computer-readable medium including a video game processing program product for causing a video game processing apparatus to control progress of a video game while displaying an object on a display screen of a display device,
- wherein the video game processing apparatus comprises a memory for storing skill related information, the skill related information containing player character information indicating a player character, skill information indicating a skill, and a skill activating condition indicating an activating condition of the skill, and
- the video game processing program product causes the video game processing apparatus to execute:
- causing the display device to selectably display a plurality of panels in a predetermined area of the display screen in a predetermined arrangement pattern;
- receiving selection of at least one panel displayed in the causing the display device to selectably display the plurality of panels, the selection being received from a user of the video game processing apparatus;
- specifying the at least one panel received in the receiving the selection of the at least one panel;
- specifying the number of panels specified in the specifying the at least one panel;
- determining whether the number of panels specified in the specifying the number of panels satisfies the skill activating condition of the player character by referring to the skill related information; and
- carrying out action processing by the skill of the player character in a case where it is determined, in the determining whether the number of panels specified in the specifying the number of panels satisfies the skill activating condition, that the number of panels satisfies the skill activating condition.

* * * * *